United States Patent [19]

Bellamy et al.

[11] 3,928,830

[45] Dec. 23, 1975

[54] DIAGNOSTIC SYSTEM FOR FIELD REPLACEABLE UNITS

[75] Inventors: Lester Ralph Bellamy, Arvada; Kenneth LeGrand Hotaling, Boulder, both of Colo.

[73] Assignee: International Business Machines Corporation, Armonk, N.Y.

[22] Filed: Sept. 19, 1974

[21] Appl. No.: 507,650

[52] U.S. Cl. ........................ 235/153 AK; 340/172.5

[51] Int. Cl.² .......................................... G06F 11/00

[58] Field of Search ............... 235/153 AK, 153 AC; 340/172.5; 317/9 AC, 31

[56] References Cited

UNITED STATES PATENTS

| | | | |
|---|---|---|---|
| 3,027,542 | 3/1962 | Silva | 235/153 AC |
| 3,581,286 | 5/1971 | Beausoleil | 340/172.5 |
| 3,641,505 | 2/1972 | Artz et al. | 340/172.5 |
| 3,803,560 | 4/1974 | DeVoy | 235/153 AK |
| 3,814,922 | 6/1974 | Nobby et al. | 235/153 AK |
| 3,838,260 | 9/1974 | Nelson | 235/153 AK |

*Primary Examiner*—Charles E. Atkinson
*Attorney, Agent, or Firm*—Homer L. Knearl

[57] ABSTRACT

The data processing system shown herein incorporates a diagnostic system that monitors functional units within the system. Further, in the event of a failure in the operation of the system, as for example a data error, the system checks its monitors for an indication of an out-of-tolerance condition or a failure in a module or field replaceable unit inside a functional unit. The out-of-tolerance sensors latch up a display that shows which field replaceable units are out of tolerance. The display is latched until manually reset by a field engineer maintaining the system. The system also logs out-of-tolerance conditions and failure conditions in conjunction with automated system recovery attempts so that a field engineer when servicing the system, will have a history with which to diagnose the system. Further, the system also has the capability in managing itself to deactivate a functional unit when the failure sensors indicate a field replaceable unit in the functional unit has failed.

7 Claims, 4 Drawing Figures

DIAGNOSTIC SYSTEM FOR FIELD REPLACEABLE UNITS

BACKGROUND OF THE INVENTION

Field of the Invention

This invention relates to data processing systems having an automated module status reporting function to aid a field engineer in servicing the system.

Problem Background

As the reliability of data processing systems is pushed to a point where the systems are essentially always operative and only their performance degrades with serviceability problems, the systems become more difficult to diagnose because the systems are effectively compensating for their own faults. For example, a system may remove a functional unit from its active use and use alternate functional units. Thus the system continues to operate; however, its efficiency may decrease as more and more functional units become inoperative and are bypassed by the system. Also, in a subsystem where the operation is the communicating of data, sophisticated error correction codes have evolved that enable the system to correct the data even though there may be many errors in a burst of data. Thus the system can correctly read out data while the functional units in the system may be degrading in performance with their age.

In this kind of environment a field engineer responsible for the maintenance of the data processing system might examine a system which would appear to be working perfectly. In actuality, because of the system's ability to error-correct itself, and the system's ability to bypass inoperative or failed functional units, the system could slowly be degrading with age. To maintain the system at peak efficiency, it would be desirable for the field engineer to know a history of performance relative to out-of-tolerance conditions on circuit modules or circuit field replaceable units. it would also be desirable to know the history relative to failures in functional units that may have been bypassed because of these failures.

Of course, circuits for monitoring modules to determine whether the voltages in the modules are within tolerances have been used in the past. Likewise, scanners for scanning a number of circuits under test are known. However, none of these devices has been used in conjunction with a system that can reconfigure itself. Therefore, they do not have the problem, and have never dealt with the problem, of trying to monitor the degradation of a system that has the ability to fix itself.

Stated in another way, the problem is to monitor a sophisticated data processing system that has the ability to correct its own errors, and further, has the ability to bypass functional units that are generating errors no longer capable of being corrected whereby system degradation not normally visible becomes visible to the field engineer.

SUMMARY OF THE INVENTION

In accordance with this invention, the above problem has been solved by providing early warning sensors and failure sensors, along with apparatus to display and/or report the output from the sensors. Monitoring is initiated by a central data processing unit which will in turn receive back the reporting of early warning or failure conditions. Once an operation fail or error condition has occurred, the central processor will initiate an operation to record or log the existence of an early warning condition and the location of a failure if a failure condition is indicated by the failure sensors.

In addition, the early warning sensors, also referred to herein as the power out-of-tolerance sensors, will set up their own display to identify the module where the voltage is out of tolerance. This display is latched up so that it will remain visible until manually reset by a field engineer. Thus, even if the module were to perform normally thereafter, a field engineer will know that at some point the module was in an out-of-tolerance condition.

Accordingly, the advantage of the invention is that while degradation of the data processing system with age may not be apparent in its operation, it will be visible to a field engineer maintaining the system. The field engineer periodically checking the system may monitor the power out-of-tolerance display to pick up early warning information about modules that may be degrading. Further, the field engineer can monitor the log of information stored by the central processor to find out when errors occurred, whether a power out-of-tolerance condition occurred and/or a failure condition occurred. Further, if there was a failure condition, the log will tell the field engineer which module suffered the failure and has since been bypassed by the data processing system.

The foregoing and other features and advantages of the invention will be apparent from the following more particular description of a preferred embodiment of the invention, as illustrated in the accompanying drawings.

DESCRIPTION OF PREFERRED EMBODIMENT

Figure 1:
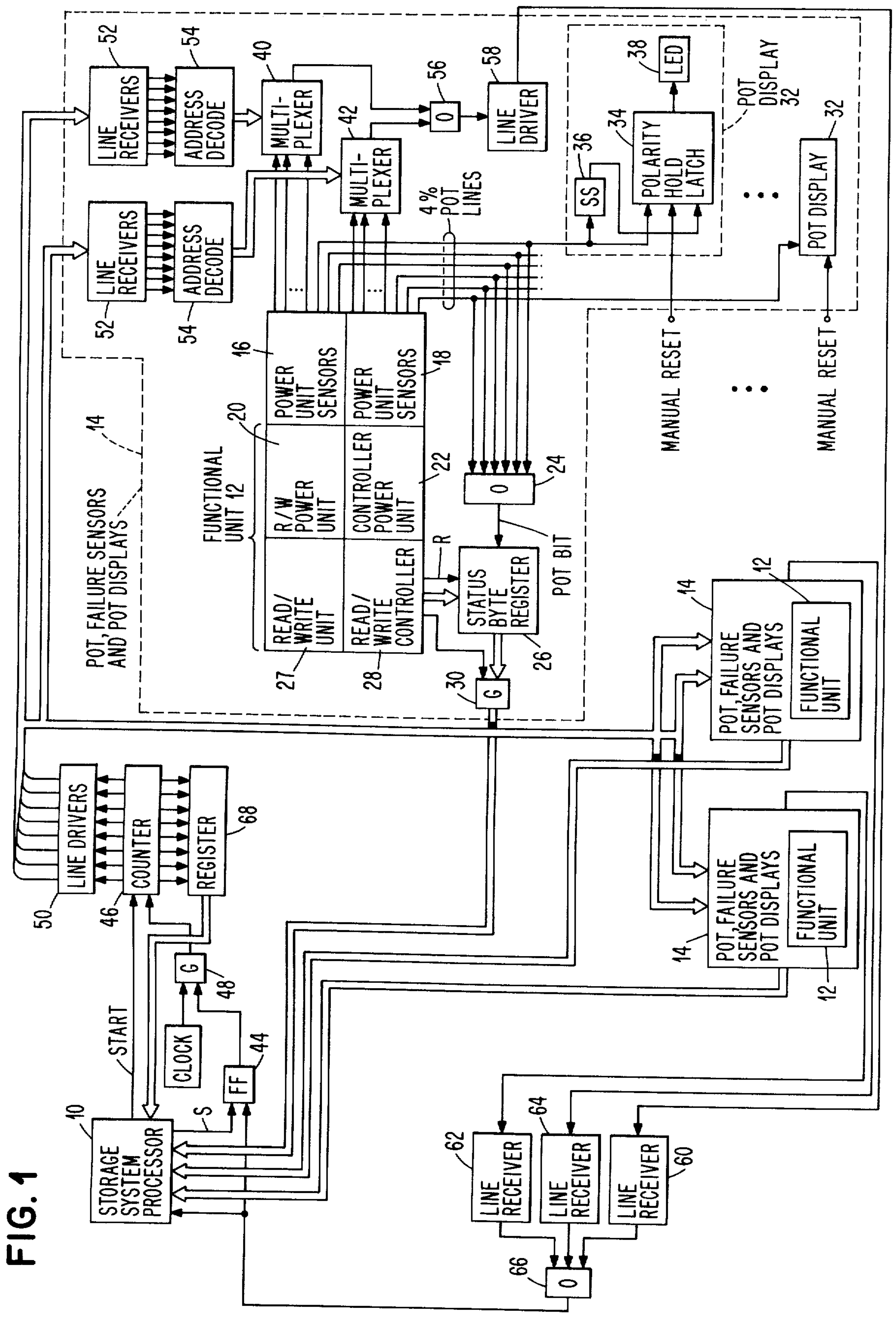
FIG. 1 shows a preferred embodiment of the invention implemented in the environment of a storage system having a storage system processor operating in conjunction with a plurality of functional units; in this case, read/write units and their controllers.

In FIG. 1 the environment of the preferred embodiment is a storage system having a storage system processor 10 which controls a plurality of functional units 12. As the operation of the storage system in controlling the reading and writing of data is not a part of this invention, the communication between the functional units and the storage system processor has not been shown. As communication between the storage system processor 10 and the POT (Power Out-of-Tolerance), failure sensors, and POT-displays 14 is part of the invention, those interconnecting data lines have been shown in FIG. 1.

Each of the failure sensors and displays 14 are associated with a functional unit 12. The operation of one POT, failure sensors, and POT-displays 14, is diagrammed in detail in FIG. 1. The sensing operation begins with the power unit sensors 16 and 18 which monitor the read/write power unit 20 and the controller power unit 22 respectively.

There are two types of power unit sensors in each of the sensors blocks 16 and 18 of FIG. 1. The first type is the power out-of-tolerance (POT) sensors or early warning sensors. The second type are the failure sensors. These sensors will be described in more detail hereinafter with reference to FIG. 2.

The POT or early warning sensors monitor modules to detect when voltages on the input or the output of the modules is approximately 4% out of tolerance. A module in such a condition will very likely still operate properly; however, the fact that it is out of tolerance is an indication it may be degrading in performance. Thus the POT sensors are associated with early warning sensing operation. The POT lines coming out of the sensors 16 and 18 are collected by OR 24 to set a POT bit in a status byte register 26. At the end of a read or write operation by read/write unit 27, controller 28 enables gate 30 to pass the status byte back to the storage system processor 10.

Each of the POT lines is also passed to a POT display 32. A POT display consists of a polarity hold latch 34, a single shot 36, and a light emitting diode (LED) 38. When a POT line goes up indicating a POT sensor has detected an out-of-tolerance condition, the polarity hold latch is excited but not yet latched. The rising edge of the signal on the POT line fires the single shot 36. If the POT line is still up when the single shot 36 times out, then the polarity hold latch is latched up and the LED 38 turns on. The purpose of the time out by the single shot 36 is so that short transient out-of-tolerance conditions will not cause the polarity hold latch to latch up and light the LED 38. LED 38 will remain on until a field engineer manually resets the polarity hold latch 34. Accordingly, the POT display for each sensor in failure sensors and displays 14 will identify for the field engineer those modules which at some time or another during the operation of the system have gone out of tolerance.

The failure sensors in sensors 16 and 18 have output lines which are collected by multiplexors. Multiplexor 40 monitors the power unit sensors for the read/write power unit, while multiplexor 42 monitors the failure sensors for the controller power unit. The function of the multiplexors 40 and 42 is to act as a selector switch so that the failure sensors may be electronically scanned.

The scanning operation is controlled by the storage system processor 10. Processor 10 will initiate a scan only when an operation fail or error condition has been detected by the processor. The scan is initiated by the processor 10 setting flip-flop 44 and enabling counter 46. When flip-flop 44 is set, it enables gate 48 to pass clock pulses to counter 46. Counter 46 is reset to zero by the start signal and thus when it receives clock pulses begins to count up. Each count represents the address of a failure sensor in one of the failure sensor and displays 14. The address from the counter 46 is communicated to the respective failure sensor display by line drivers 50 driving the line receivers 52 at each failure sensor and displays 14.

To each line receiver 52 is attached an address decode 54. If the address decoded corresponds to one of the failure sensors which the address decode is associated with, the address decode will enable its associated multiplexor 40 or 42 to pass the output from that failure sensor to an OR 56.

OR 56 collects the outputs from multiplexors 40 and 42 and passes the binary condition to a line driver 58. Line driver 58 drives a signal back to a line receiver 60 adjacent the storage system processor 10. Line receivers 62 and 64 are associated with other failure sensors and displays 14. Any failure indication received by a line receiver 60, 62 or 64 is collected by OR 66. The failure condition is passed back to storage system processor 10 and resets the flip-flop 44 to stop the scan operation.

When the scan operation detects a failure, the storage system processor 10 can gate out the address of the failure from register 68. Register 68 is a mirror of the contents of the counter 46. The processor 10 will then log the failure condition along with its address and may then continue the scan by setting flip-flop 44 again so that gate 48 is enabled. With gate 48 enabled, the clock pulses passed to counter 46 cause the counter to resume the scan.

Note that the power unit sensors 16 and 18 and their associated communication apparatus to the processor 10 are powered by the power units in the processor. Therefore, if the power units 20 and 22 that supply the functional unit go down, the sensors will be able to notify the processor 10 of the failure. The communication apparatus that is powered by the processor 10 include the line receivers 52, address decodes 54, multiplexors 40 and 42, OR 56, line driver 58, and POT-displays 32.

Figure 2:
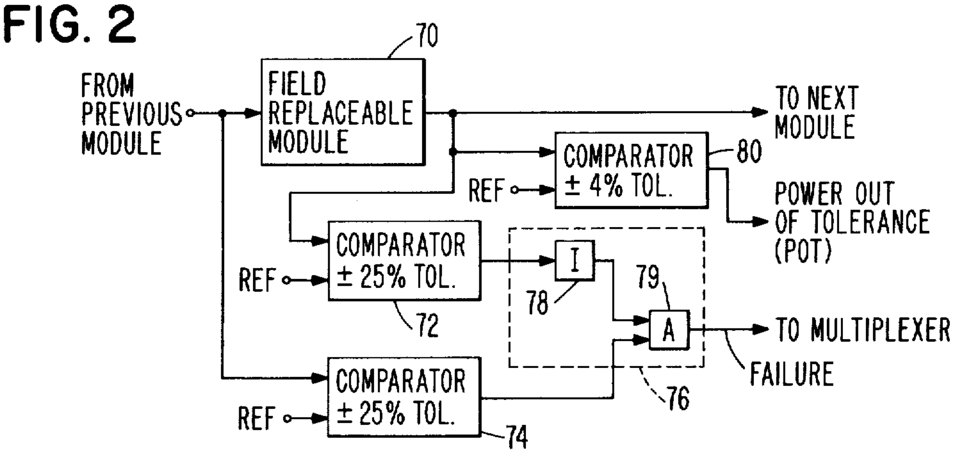
FIG. 2 shows an example of a power unit sensor that may be used to implement the plurality of power unit sensors represented in FIG. 1.

Referring now to FIG. 2, an example of a POT sensor and a failure sensor is shown. The circuit being monitored by the sensors would typically be a field replaceable module 70. The failure sensor is made up of comparators 72 and 74 along with logic 76. Comparator 72 monitors the output of the module 70 to determine if the output is within 25% of normal as defined by a reference. Likewise, comparator 24 monitors the input to the module to determine if the input is within 25% of normal.

Comparators 72 and 74 have an up output so long as the signals they monitor are within tolerances. Accordingly, a failure would be detected when logic 76 determines that the output from comparator 74 is up, while the output from comparator 72 is down. Logic 76 is implemented with an inverter 78 to monitor the output of comparator 72 and an AND gate 79 to combine the inverted output from 72 with the output from 74. Thus AND gate 79 will have an up output indicating a failure of module 70 if comparator 72 goes down indicating the output is out of tolerance while comparator 74 stays up indicating the input is within tolerance.

The 25% tolerance used in the comparators 72 and 74 is not critical. A tolerance should be chosen such that an indication outside of the tolerance would be indicative of a failure of the module.

It will be appreciated by one skilled in the art that logic 76 could be greatly enlarged to monitor more than one field replaceable module. For example, a set of modules might be monitored by comparators attached to selected module input/outputs and logic 76 might consist of tree logic to identify which module in the set of modules has failed.

The POT sensor, or power out-of-tolerance sensor, consists of comparator 80. Comparator 80 monitors the output of the field replaceable module 70 to determine when the output is within 4% of normal operation defined by a reference signal applied to the comparator 80. Comparator 80 could be attached to the input of the module or the output of the module. The selection of which lines are monitored by the POT sensors is a matter of choice and might normally be used on more critical lines, or the lines that would give an early warning indication of degradation. The 4% tolerance used by the comparator 80 is also a matter of choice. A tolerance range should be chosen to satisfy the early warning function.

Figure 3A:
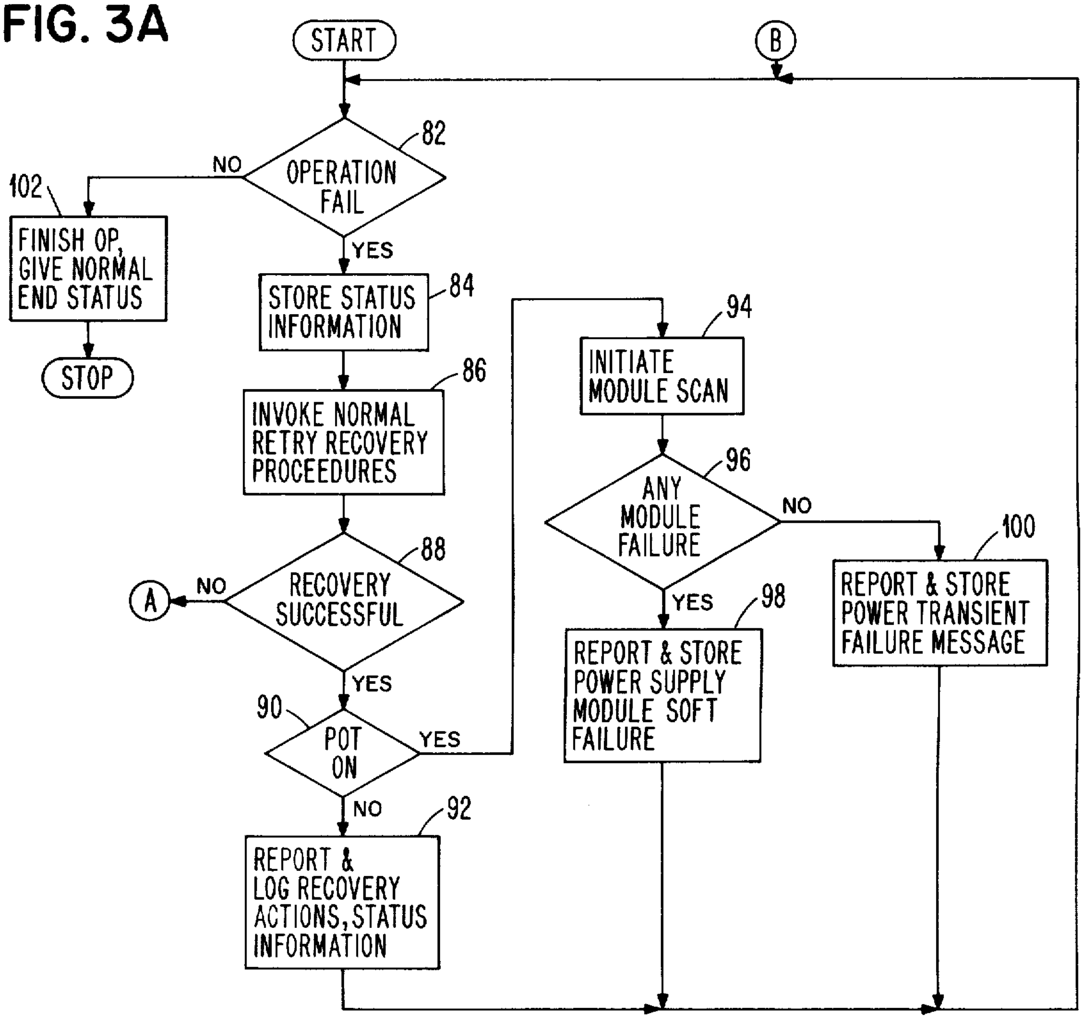
FIGS. 3A and 3B show the process flow through the central processor, or in this case, storage system processor as it monitors the power unit sensors and logs the early warning and failure conditions.

In FIG. 3A the operation of the storage system processor 10 of FIG. 1 is diagrammed as it controls the sensing and logging operation for the storage system. The process begins whenever the storage system processor detects a read/write operation has failed and error recovery procedures must be tried. Decision block 82, when an operation failure occurs, causes the process to branch to block 84. During block 84 processor 10 stores the status byte received from status byte register 26. Next at block 86, the processor invokes its normal error recovery retry procedures. These procedures may consist of attempting to read the same data again or write the same data again, and may also involve error correction codes, attempting to decode the data containing bits in error. The logging or reporting operation then proceeds and may take one of two separate paths depending upon whether the recovery was successful or unsuccessful.

If the recovery was successful, decision block 88 branches processor control to decision block 90. If the POT bit in the status byte is not on, then process control passes from the decision block 90 to the report block 92. In block 92 the processor 10 reports and logs all the recovery action necessary to recover from the error plus the status information received from the status byte.

If the POT bit in the status byte is on, then the process control passes from decision block 90 to process block 94. At process block 94, the processor 10 initiates the module scan for failures as previously described with reference to FIG. 1. Decision block 96 then monitors the results of that scan to determine if there was any module failure. If there is a module failure, control passes to processing block 98 where processor 10 reports and stores, i.e. logs, the address of the module which failed. This failure is considered a soft failure in that the retry recovery procedures were able to recover from the failure.

On the other hand, if no module failure is detected during the module scan, the process branches from decision block 96 to process block 100. At process block 100 processor 10 reports or logs that there was a power transient failure due typically to a transient condition on the outside power lines supplying the processing system.

The output from each of the processing blocks 92, 98 and 100 loops back to decision block 82. In other words, the logging or reporting operation is complete and the system is ready for the next operation. Typically, the next operation would not fail, and the process would branch from decision block 82 to process block 102 which indicates that the operation was finished successfully and had a normal end status. Processing then continues until an error or operation failure occurs.

Figure 3B:
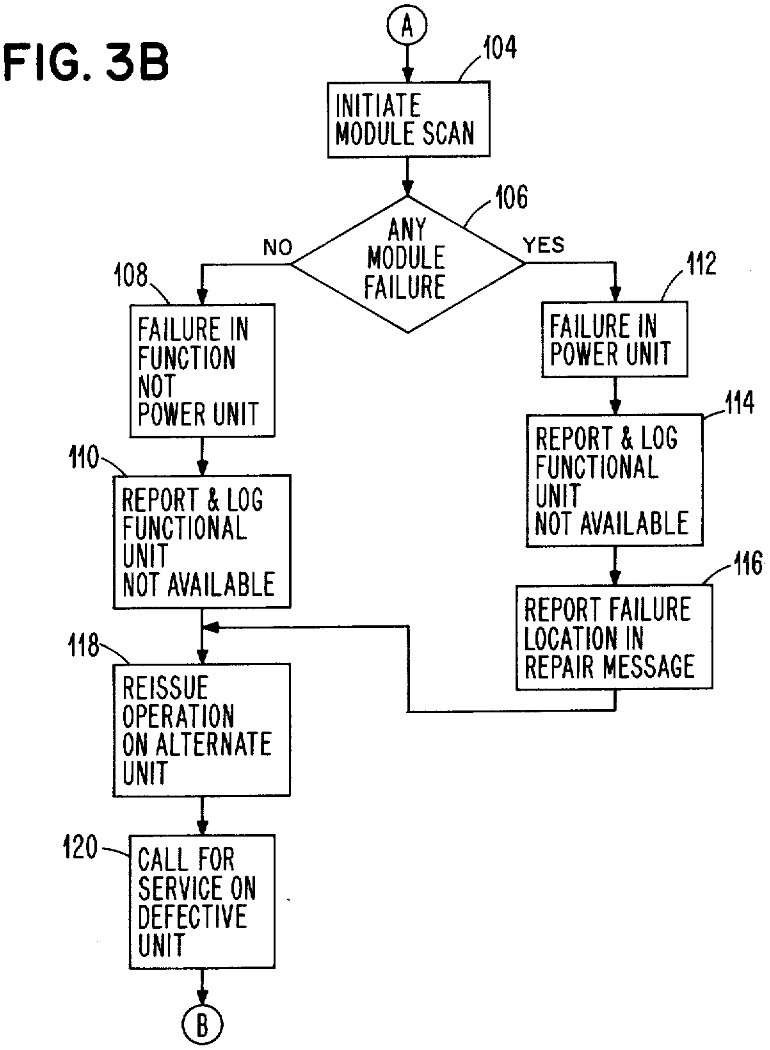

Referring again to decision block 88 in FIG. 3A, note that if the retry recovery procedure is not successful, the process branches from decision block 88 to FIG. 3B. In FIG. 3B the module scan and logging operation or reporting operation is shown in a situation where retry recovery was not successful.

In FIG. 3B the procedure began at processing block 104 where processor 10 initiates the scan of the modules previously described with reference to FIG. 1. Decision block 106 represents the processor 10 monitoring the results of the modular scan. If there is no module failure, the process branches to processing block 108. At processing block 108 processor 10 indicates that the failure is in the functional unit and not the power unit. This is deduced by the processor since the power unit sensors 16 and 18 only monitor the power unit and not the function modules supplied with power from the power unit. This follows logically since the retry recovery was not successful and the power unit modules check out okay during the module scan.

The processor 10 in the next process step 110 reports that the functional unit is not available and enters that in the log for subsequent use by the field engineer.

If the module scan indicates there was a module failure, then the process will branch from decision block 106 to process block 112. Process block 112 indicates the logical decision by processor 10 that the failure must be in a power unit. At processing step 114 the processor logs the functional unit as not available. Further, at processing step 116 processor 10 logs the address of the module that failed as obtained from register 68 (FIG. 1). Thus the field engineer, when he reviews the log, will know which field replaceable module in the power unit must be replaced.

After the reporting or logging operation is completed either at processing block 110 or processing block 116, the process proceeds to processing block 118. At block 118 the processor 10 electronically removes from its usable system the functional unit that has failed. At the same time the processor 10 selects an alternate unit for performing operations which might previously have been assigned to the functional unit removed. Immediately thereafter at process block 120, the processor 10 logs a message calling for service on the defective functional unit.

With the defective functional unit removed from the system, process control returns to FIG. 3A and again tries to perform the operation desired. Very probably with an alternate unit the operation will succeed. The process will branch from decision block 82 to processing block 102 indicating that the operation was finished successfully and a normal end status exists.

While the invention has been particularly shown and described with reference to a preferred embodiment thereof, it will be understood by those skilled in the art that various changes in form and detail may be made therein without departing from the spirit and scope of the invention.

What is claimed is:

1. Module status reporting apparatus for assisting diagnosis of the operative condition of modules in functional units in a data processing system, said apparatus comprising:

early warning sensing means connected to the modules in the functional units for sensing degradation in the operation of a module;

failure sensing means connected to the modules in the functional units for sensing failure in the operation of a module;

scanning means initiated by the data processing means and connected to said failure sensing means for scanning said failure sensing means;

early warning reporting means connected to said early warning sensing means for reporting early warning status of functional unit back to the data processing system;

failure address reporting means connected to said scanning means and said failure sensing means for reporting to the data processing system addresses of failed modules in the functional units.

2. The apparatus of claim 1 wherein said early warning sensing means comprises:

a plurality of comparing means each comparing means for comparing the signal in a module to a reference range chosen such that if the signal departs from the range, said comparing means will indicate the module is degrading although the module may still be operative.

3. The apparatus of claim 2 and in addition:

a plurality of display means with each display means connected to one of said comparing means for displaying the indication that the module connected to the comparing means has a signal outside the reference range;

time out means connected to each of said display means for controlling each display means so that each display means will not be operative to display out-of-reference range conditions shorter in duration than the time out interval of said time out means.

4. The apparatus of claim 1 wherein said early warning sensing means and said failure sensing means are connected only to modules that supply power to the functional units.

5. In a storage system having a plurality of storage units, each storage unit having a read/write unit with a read/write controller and said system further having a processor for maintaining reliability of the system by compensating for operative failures by said storage units, apparatus for reporting the failure and status of modules in said storage units whereby the internal degradation of the system becomes visible, said reporting apparatus comprising:

first means connected to each of said storage units for sensing that signals on modules in the storage unit are out of tolerance;

second means connected to each of said storage units for sensing that modules in the storage unit have failed;

display means connected to said first sensing means for permanently displaying an indication of a signal out of tolerance until said display is manually reset;

scanning means connected to the processor for addressing each of said second sensing means when said scanning means is initiated by the processor;

module failure reporting means connected to said scanning means and said second sensing means for reporting to the processor the address of any module failure sensed by said second sensing means.

6. The apparatus of claim 5 wherein the tolerance range of said first sensing means is chosen to provide an early warning of degradation in each module.

7. The apparatus of claim 5, wherein said first and second sensing means are connected only to modules which supply power to the storage units.

* * * * *